United States Patent
Kuo

(10) Patent No.: US 6,802,628 B2
(45) Date of Patent: Oct. 12, 2004

(54) VERTICALLY DOWNWARD TYPE BACK-LIGHT MODULE

(76) Inventor: Heng Huang Kuo, No. 6, Lane 73, Hsin Yi Rd., Lo Chou City, Taipei Hsien (TW)

(*) Notice: Subject to any disclaimer, the term of this patent is extended or adjusted under 35 U.S.C. 154(b) by 0 days.

(21) Appl. No.: 10/277,237

(22) Filed: Oct. 18, 2002

(65) Prior Publication Data

US 2004/0076010 A1 Apr. 22, 2004

(51) Int. Cl.[7] .............................................. F21V 5/00
(52) U.S. Cl. ...................... 362/332; 362/224; 362/339; 362/367; 362/561
(58) Field of Search .......................... 362/332, 333, 362/330, 223, 339, 328, 217, 224, 225, 367, 561

(56) References Cited

U.S. PATENT DOCUMENTS

| | | | | |
|---|---|---|---|---|
| 3,686,495 A | * | 8/1972 | Medley | 362/223 |
| 4,933,820 A | * | 6/1990 | Engel | 362/217 |
| 5,530,628 A | * | 6/1996 | Ngai | 362/33 |
| 5,564,815 A | * | 10/1996 | Littman et al. | 362/147 |
| 6,523,986 B1 | * | 2/2003 | Hoffmann | 362/576 |

* cited by examiner

Primary Examiner—John Anthony Ward
(74) Attorney, Agent, or Firm—Rosenberg, Klein & Lee

(57) ABSTRACT

A vertically downward back-light module of the invention comprises a light-guiding panel, a light source, a reflective element, and a base. The light-guiding panel includes a bottom reflecting surface in which is formed a slot having a corrugated diffusing surface and light entry side surfaces. The light-guiding panel includes lateral wings respectively extending at a side of each light entry side surface. Each lateral wing extends in inclination relative to a horizontal plane including the opening of the slot in which is placed the light source. The reflective element covers the bottom reflecting surface and encapsulates the light source in the light-guiding panel. The light-guiding panel with the light source are mounted on the base. The light from the light source partially travels through the corrugated diffusing surface, and partially through the lateral wings. The brightness in proximity of the light source is thereby reduced.

8 Claims, 6 Drawing Sheets

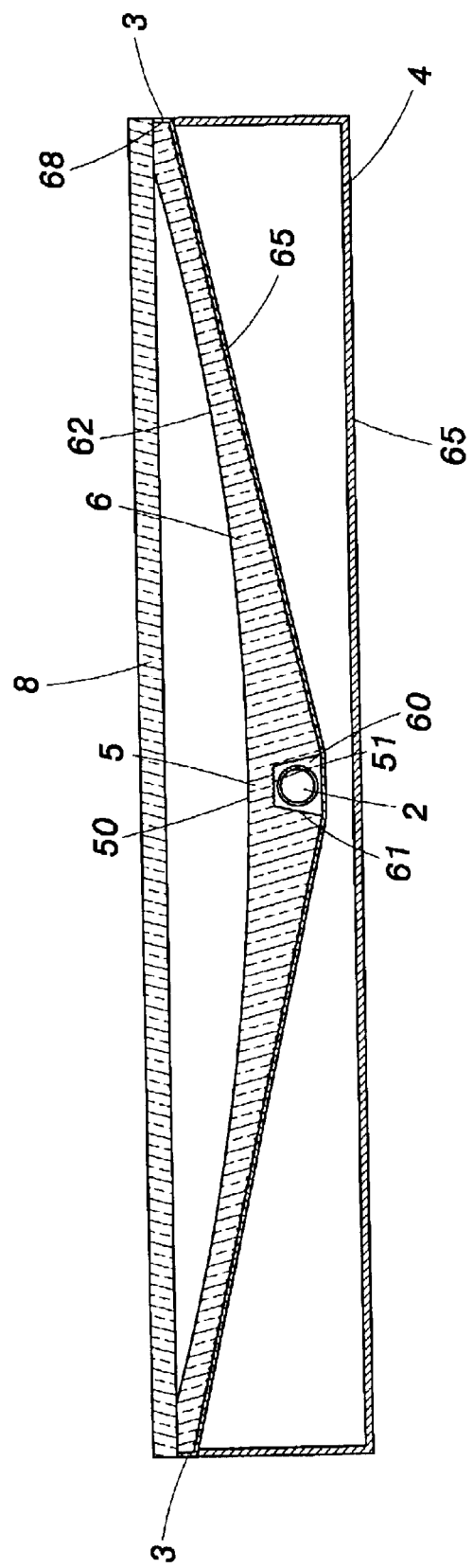

VERTICALLY DOWNWARD TYPE BACK-LIGHT MODULE

BACKGROUND OF THE INVENTION

1. Field of the Invention

The invention relates to a vertically downward back-light module and, more particularly, to a back-light module that transfers light rays into a light plane, suitable for use with LCD devices.

2. Description of the Related Art

Traditionally, a display device uses electron beam technology to produce light and image on a curved or flat surface display screen. Due to the constraints of electron beam technology, this traditional display device usually requires the mount of a voluminous electron tube.

With the development of liquid crystal display (LCD) technology, the size and weight of the display device are substantially reduced, which not only improves the esthetic of the display device but also its carrying. The modern LCD device usually incorporates the mount of a back-light module that provides the adequate light to the flat display panel. An important factor then is the light uniformity provided by the back-light module at every position of the display screen.

As illustrated in FIG. 1, a conventional back-light module comprises a light-guiding panel 1a, a light source 2a, a reflective element 3a, and a base 4a. The light-guiding panel 1a includes a top light outgoing surface 10a and a bottom light entry surface 11a. The light source 2a is mounted below the light entry surface 11a at a corresponding central location. The reflective element 3a covers the lateral sides of the light-guiding panel 1a. The base 4a is formed arcuate, receiving the mount of the light-guiding panel 1a and the light source 2athereon. The light from the light source 2ais thereby outputted via the light outgoing surface 10a, and loss of light through other parts of the light-guiding panel 1a, except the light outgoing surface 10a, is thereby prevented. The reflective element 40a is formed on the surface of the base 4a by, for example, plating, to provide light reflection and increase the brightness of the light outgoing surface 10a.

In the above back-light module, the light from the light outgoing surface is substantially concentrated around the light source at a central location below the light entry surface. The brightness of the light outgoing surface is therefore excessive at the central region and gradually decreases along the lateral sides. The light uniformity therefore is not satisfactory. Furthermore, due to the arcuate shape of the base, the size and more particularly the thickness of the back-light module are therefore relatively large, which increases the surface area of the reflective element and, consequently, the fabrication cost.

SUMMARY OF THE INVENTION

It is therefore a principal object of the invention to provide a vertically downward back-light module that improves the light uniformity and the brightness of the light outgoing surface of the light-guiding panel.

It is another object of the invention to provide a vertically downward back-light module that is dimensionally reduced to an adequate thinness.

To accomplish the above and other objectives, a vertically downward back-light module of the invention comprises a light-guiding panel, a light source, a reflective clement, and a base. The light-guiding panel includes a bottom reflecting surface in which is formed a slot having a corrugated diffusing surface and light entry side surfaces. The light-guiding panel includes lateral wings respectively extending at a side of each light entry side surface. Each lateral wing extends with an inclination angle relative to a horizontal plane including the opening of the slot through the bottom reflecting surface. The light source is placed in the slot. The reflective element covers the bottom reflecting surface and encapsulates the light source in the light-guiding panel. The light-guiding panel with the light source are mounted on the base.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 5 is a sectional view of a back-light module according to a third embodiment of the invention.

DETAILED DESCRIPTION OF THE EMBODIMENTS

Figure 1:
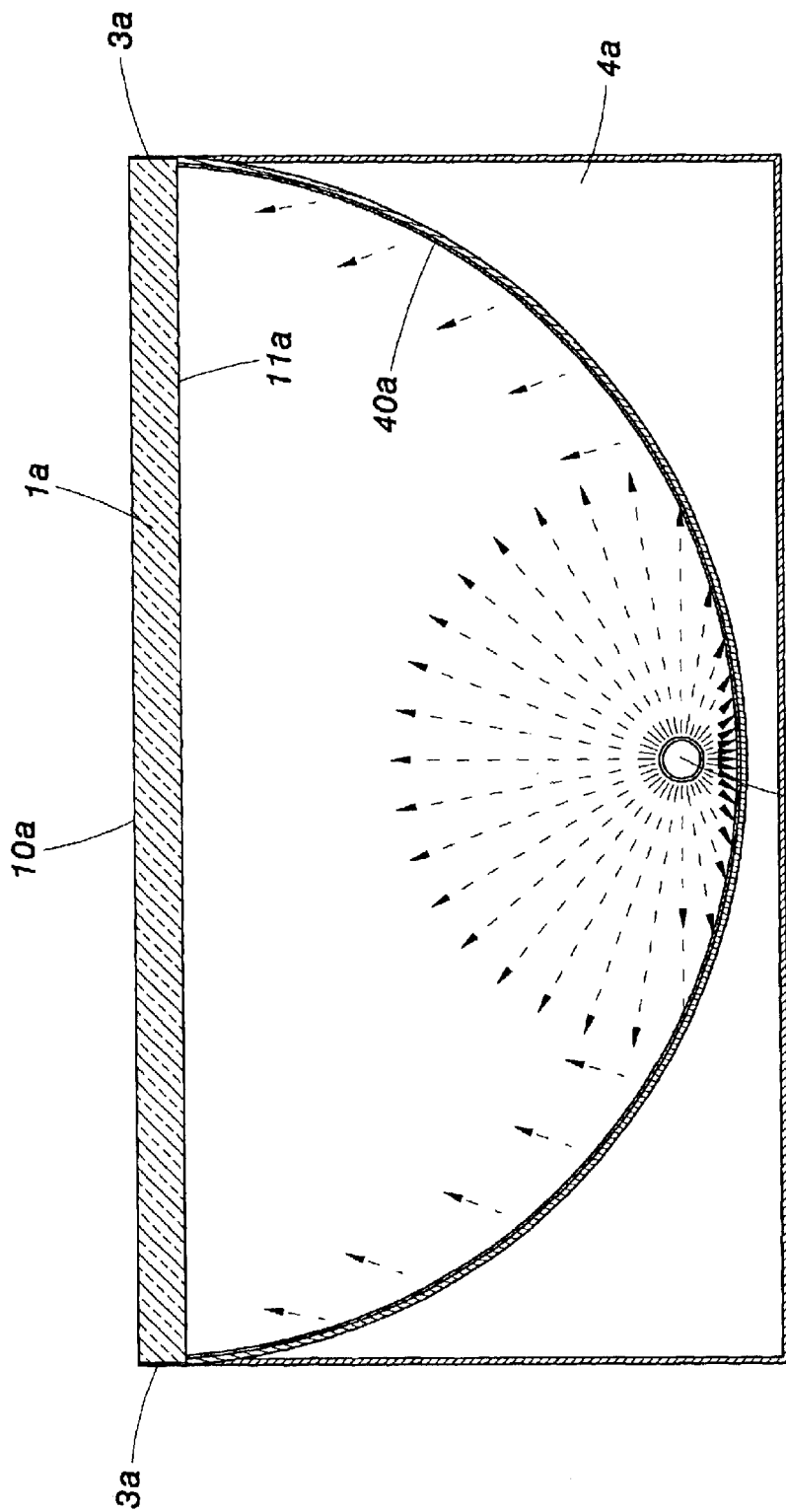
FIG. 1 is a sectional view of a back-light module known in the prior art.

Wherever possible in the following description, like reference numerals will refer to like elements and parts unless otherwise illustrated.

Figure 2:
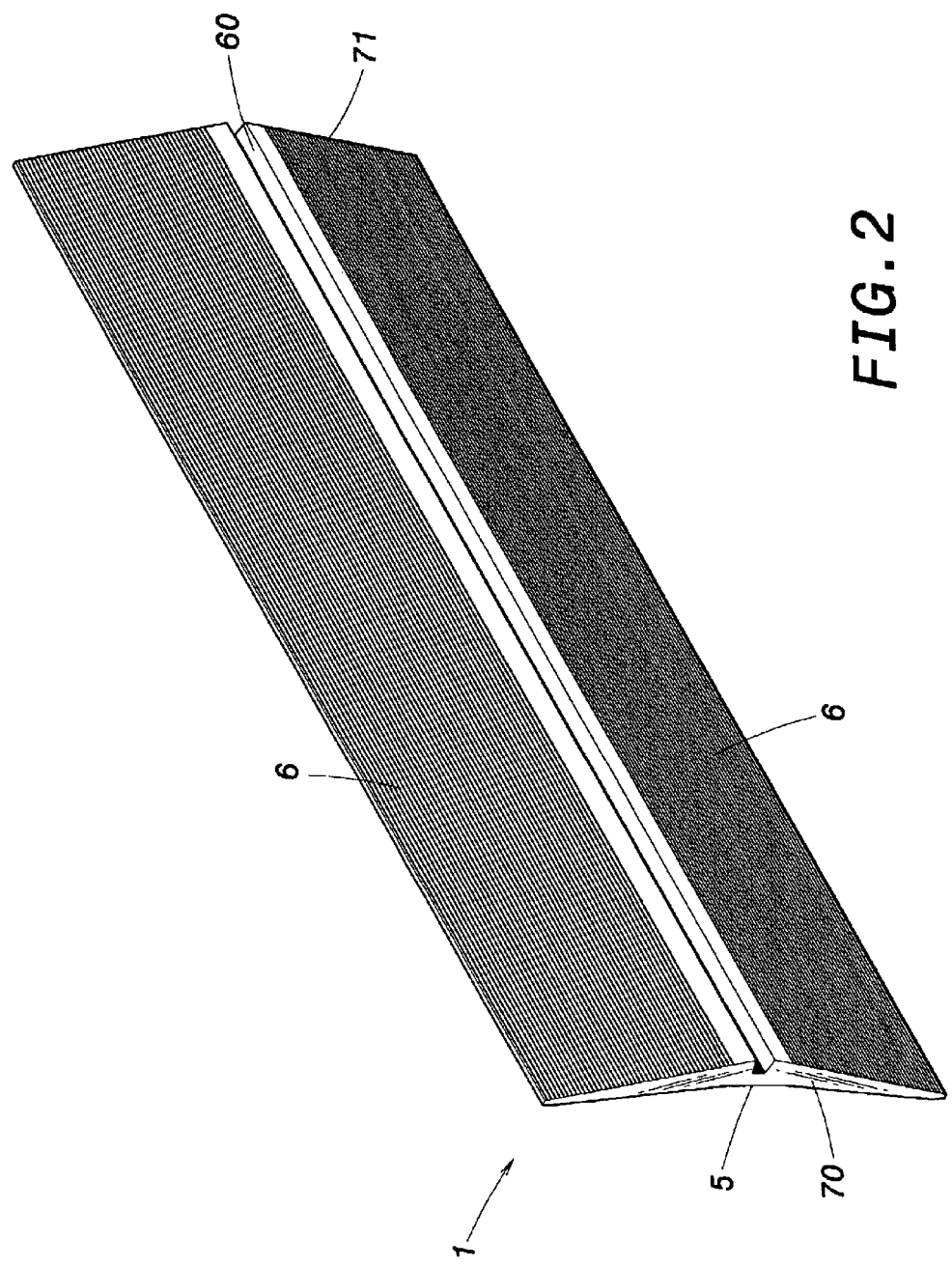
FIG. 2 is a perspective view of a light-guiding panel according to an embodiment of the invention.
Figure 3:
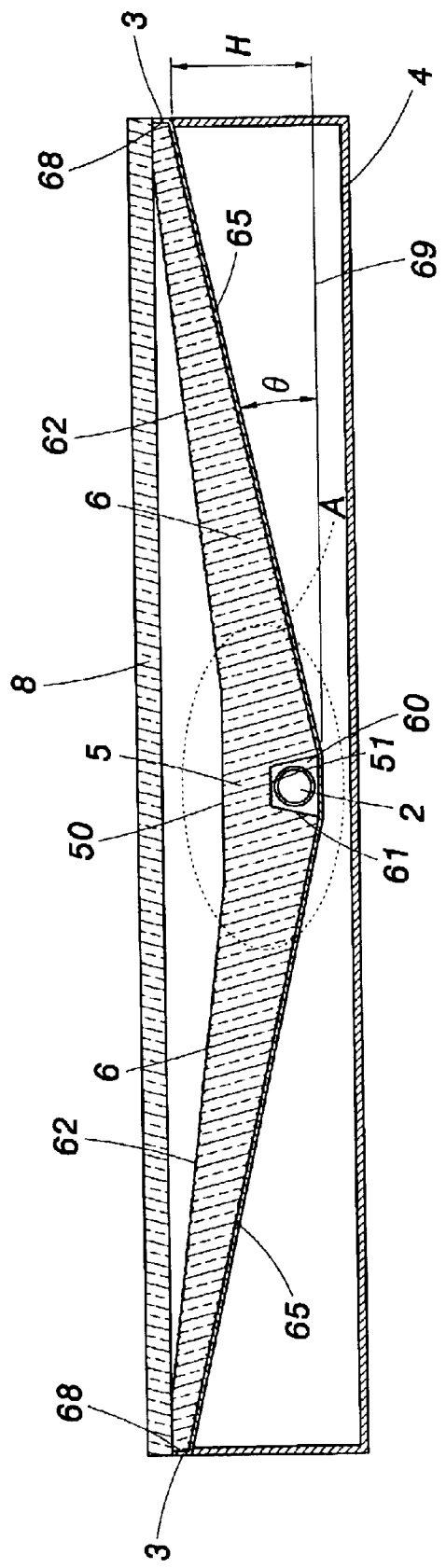
FIG. 3 is a sectional view of a back-light module according to a first embodiment of the invention.
Figure 3A:
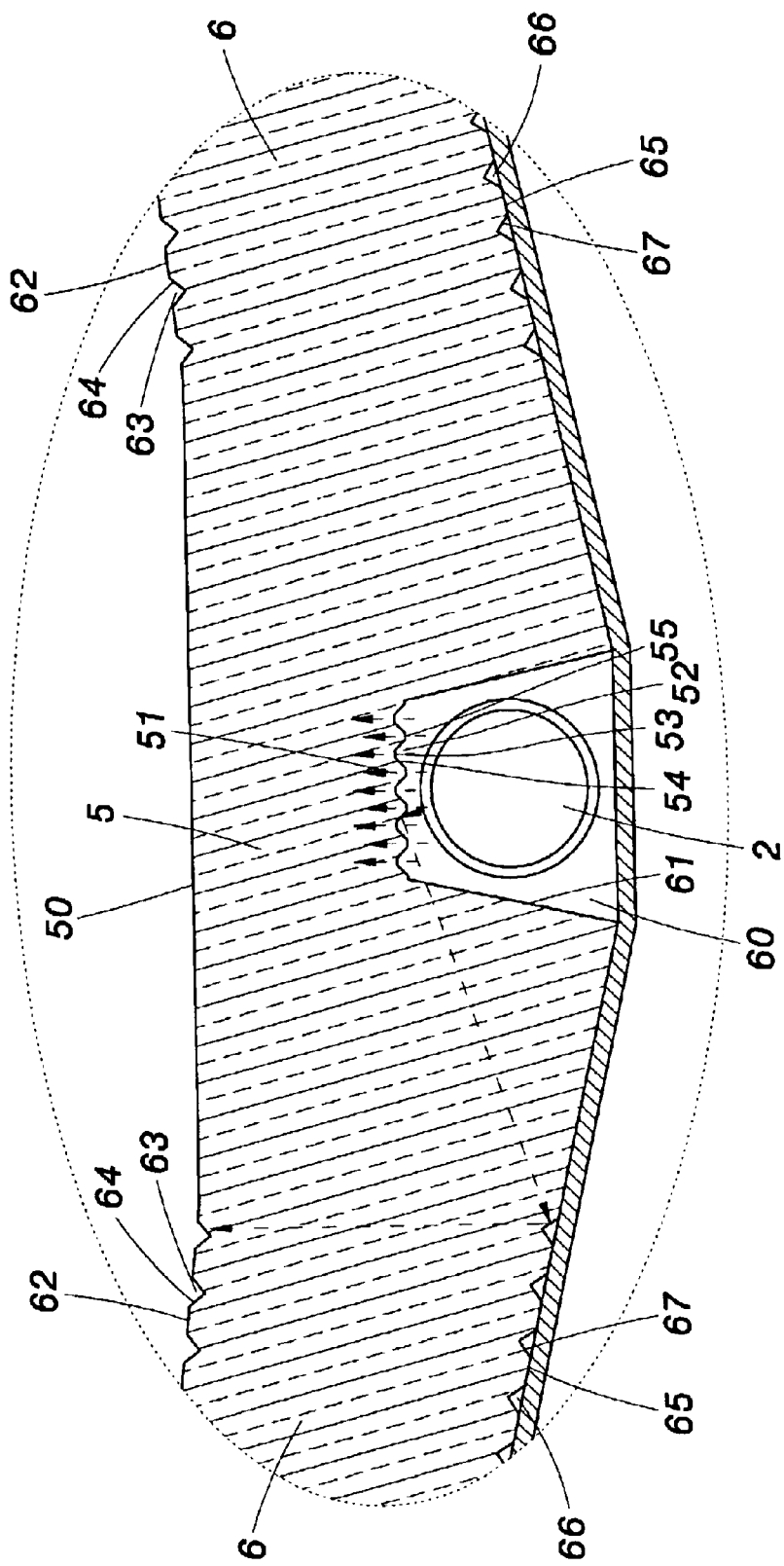
FIG. 3A is a locally enlarged view of the portion A of FIG. 3.

Reference now is made to FIG. 2, FIG. 3 and FIG. 3A to describe a vertically downward back-light module structure according to an embodiment of the invention. As illustrated, the back-light module comprises a light-guiding panel 1, a light source 2, a reflective element 3, and a base 4.

The light-guiding panel 1 includes a bottom reflecting surface 65 that is corrugated and has a plurality of ridges 66. Each ridge 66 has an inclined portion 67 the inclination angle of which adequately varies according to the location of the ridge 66. The reflecting surface 65 includes a slot 60 having a corrugated diffusing surface 51, including a plurality of ridges 52 spaced apart from one another by transparent valleys 55. Each ridge 52 includes a reflecting portion 54 and a transparent portion 53. The reflecting portion 54 is formed with an inclination angle that varies according to the location of the reflecting portion 54. The slot 60 further includes light entry side surfaces 61. A portion of the light-guiding panel 1 above the diffusing surface 51 of the slot 60 is referred to as a light source portion 5, upwardly limited by a top light outgoing surface 50. Portions of the light-guiding panel 1 respectively at one side of each the light entry side surface 61 are referred to as lateral wings 6, the top surfaces of which are referred to as light outgoing surfaces 62. The light outgoing surfaces 62 are corrugated, including a plurality of ridges 63 that respectively have inclined portions 64 the respective inclination angles of which vary according to the respective locations of the ridges 63. The lateral wings 6 respectively terminate in end surfaces 68 that are relatively far away from the light entry side surfaces 61 of the slot 60. The thickness of each lateral wing 6 gradually decreases from the light entry surface 61 to the corresponding end surface 68. Each lateral wing 6 further extends with an inclination angle θ relative to a horizontal plane including the opening of the slot 60, so that its corresponding end surface 68 is distant a height H from the horizontal plane 69. It will be understood that the angle θ and the height H may be adequately adjusted to accord with the required dimensional volume of the back-light module and its light uniformity. The slot 60 oppositely terminates at a front side 70 and a rear side 71 of the light-guiding panel 1.

The light source 2 is placed inside the slot 60 of the light-guiding panel 1, and emits a light that travels through the light-guiding panel 1.

The reflective element 3 respectively covers the reflecting surface 65, the front and rear sides 70, 71, and the end surfaces 68 of the lateral wings 6, while encapsulating the light source 2 in the light-guiding panel 1.

The light-guiding panel 1, with the light source 2, is mounted on the base 4. The light from the light source 2 substantially passes through the diffusing surface 51 and the light entry side surfaces 61 into the light-guiding panel 1, which prevents light loss. In the assembly of the light-guiding panel 1 with the base 4, the reflective element 3 contacts with the top of the base 4.

Referring to FIG. 3A, the light emitted from the light source 2 strikes the diffusing surface 51 that, by means of the ridges 52, controls the brightness and the light uniformity of the light outgoing surface 50 over the light source portion 5. A part of light passes through the transparent valleys 55 and the transparent portions 53 of the ridges 52 on the diffusing surface 51, and travels through the light source portion 5 of the light-guiding panel 1 to its light outgoing surface 50.

Meanwhile, another portion of light is reflected from the reflecting portions 54, (via their respective inclination angles) of the ridges 52 of the diffusing surface 51 toward the light entry side surfaces 61 of the slot 60, and subsequently travels through the lateral wings 6. The brightness from the light source portion 5 of the light-guiding panel 1 and the excessive brightness proximate to the light source 2 are thereby reduced since a portion of light is deviated through the lateral wings 6 to compensate the brightness of other parts of the light-guiding panel 1.

The light from the light source 2 that reflects via the ridges 52 is directed to the light entry side surfaces 61 of the slot 60. Provided with adequate inclinations, the inclined portions 67 of the ridges 66 on the reflecting surface 65 further reflect the light travelling inside the light-guiding panel 1 to the light outgoing surfaces 62. Meanwhile, due to the gradual decrease of the thickness of the lateral wings 6, the light inside the light-guiding panel 1 is favorably guided toward the end surfaces 68. As a result, the brightness of the light outgoing surfaces 62 of the lateral wings 6 is more uniform.

Referring to FIG. 3, a diffusing element 8 may be further placed over the light-guiding panel 1. Because the difference of brightness between the light outgoing surface 50 of the light source portion 5 and the light outgoing surfaces 62 of the lateral wings 6 is reduced, the light that comes to the diffusing element 8 produces a more uniform brightness. By refraction via the inclined portions 64 of the ridges 63, the light outgoing surface 62 is rendered dulled, which increases the glow.

Figure 4:
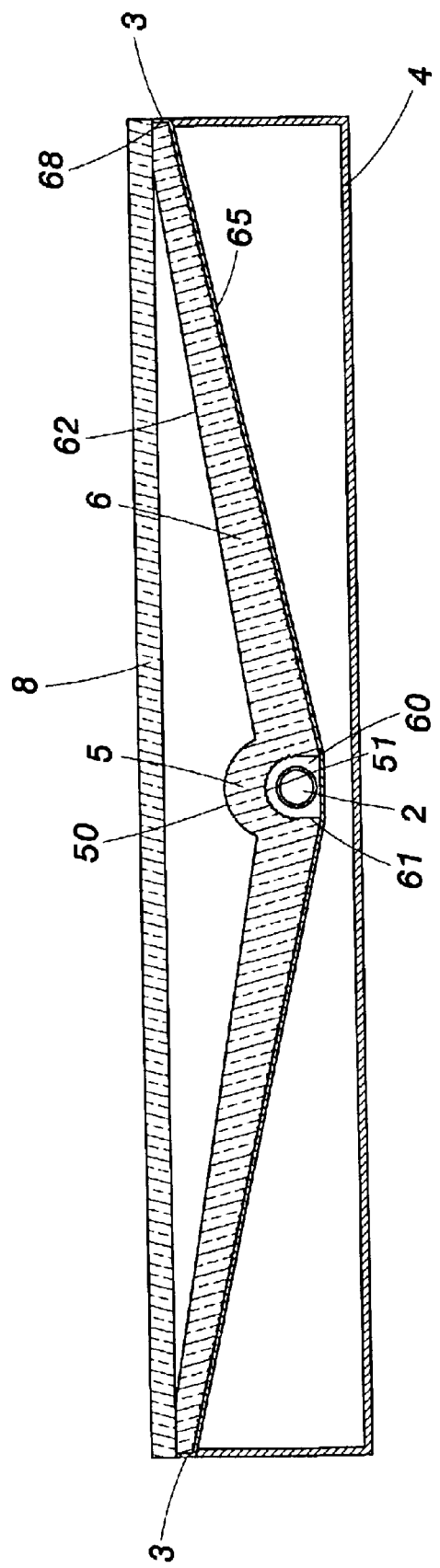
FIG. 4 is a sectional view of a back-light module according to a second embodiment of the invention.

Referring to FIG. 4, the diffusing surface 5 of the slot 60 may be formed arcuate to further provide an adequate light uniformity.

Referring to FIG. 5, the light outgoing surfaces 62 of the lateral wings 6 may be also formed arcuate to provide the desired light uniformity.

As described above, the vertically downward type back-light module of the invention therefore includes the following characteristics and advantages.

(1) By providing a corrugated diffusing surface in the slot, the brightness of the light source portion of the light-guiding panel, proximate to the location of the light source, is reduced. Meanwhile, the brightness of the lateral wings is increased. The consequent difference of brightness there between is therefore reduced, which improves the light uniformity of the light outgoing surfaces of the light-guiding panel.

(2) By providing a corrugated reflecting surface of the lateral wings, accompanied with corrugated light outgoing surfaces, the light uniformity of the light outgoing surfaces of the light-guiding panel is rendered more uniform.

(3) By inclining the lateral wings so that its end surfaces are elevated and, furthermore, by forming the lateral wings with a gradually decreased thickness, the light propagation toward the end surfaces is promoted. As a result, the light uniformity of the light outgoing surfaces of the light-guiding panel is improved.

(4) Via the specific arrangement of the lateral wings as described above, the size of the back-light module is favorably reduced.

Those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A vertically downward back-light module structure comprising:

a light-guiding panel having a reflecting surface formed in a bottom portion thereof, the bottom portion having a slot formed externally therein, the slot being defined by a diffusing surface and at least a pair of light entry surfaces formed thereabout the light-guiding panel forming lateral wings respectively extending from the light entry surfaces, the diffusing surface being corrugated with a plurality of first ridges, at least a portion of each of the lateral wings being inclined in angular orientation from a plane defined relative to an opening of the slot;

a light source, disposed within the slot external to the light-guiding panel;

a reflective element, covering the bottom reflecting surface of the light-guiding panel and enclosing the light source in the slot; and a base, the light-guiding panel and the light source in mounted thereon.

2. The structure of claim 1, wherein the reflecting surface of the light-guiding panel is corrugated with a plurality of second ridges that respectively include inclined portions having angles of inclination respectively corresponding to locations of the second ridges.

3. The structure of claim 1, wherein the diffusing surface of the slot has a plurality of transparent valleys.

4. The structure of claim 1, wherein the first ridges further respectively include reflecting portions and transparent portions, the reflecting portions being inclined with angles of inclination respectively corresponding to locations of the first ridges.

5. The structure of claim 1, wherein the lateral wings each include a top light outgoing surface that is corrugated with a plurality of third ridges, the third ridge having respective inclined portions the inclination angles of which vary according to the respective locations thereof.

6. The structure of claim 1, wherein the lateral wings respectively terminate in end surfaces, the thickness of each lateral wing gradually decreasing from one light entry side surface to the corresponding end surface.

7. The structure of claim 6, wherein the slot extends between a front side and a rear side of the light-guiding panel, the reflective element covering the front and rear sides of the light-guiding panel and the end surfaces of the lateral wings.

8. The structure of claim 6, wherein a top of the base is mounted to the reflective element adjacent the end surfaces of the lateral wings of the light-guiding panel.

* * * * *